US009081386B2

(12) United States Patent
Bernini (10) Patent No.: US 9,081,386 B2
(45) Date of Patent: Jul. 14, 2015

(54) WORKING APPARATUS FOR A LIMITED AREA

(71) Applicant: Fabrizio Bernini, Bucine (IT)

(72) Inventor: Fabrizio Bernini, Bucine (IT)

( * ) Notice: Subject to any disclaimer, the term of this patent is extended or adjusted under 35 U.S.C. 154(b) by 0 days.

(21) Appl. No.: 14/317,236

(22) Filed: Jun. 27, 2014

(65) Prior Publication Data
US 2015/0032320 A1    Jan. 29, 2015

(51) Int. Cl.
| | |
|---|---|
| G01C 22/00 | (2006.01) |
| G06F 19/00 | (2011.01) |
| G05D 1/02 | (2006.01) |
| A01D 34/00 | (2006.01) |
| A47L 11/40 | (2006.01) |
| E04H 4/16 | (2006.01) |

(52) U.S. Cl.
CPC ............ *G05D 1/0259* (2013.01); *A01D 34/008* (2013.01); *A47L 11/4011* (2013.01); *E04H 4/1654* (2013.01); *G05D 1/0225* (2013.01); *G05D 1/0261* (2013.01)

(58) Field of Classification Search
CPC  G05D 1/0259; A47L 11/4011; E04H 4/1654; A01D 34/008
USPC ................................ 701/2, 23; 700/245, 261
See application file for complete search history.

(56) References Cited

U.S. PATENT DOCUMENTS

| | | | |
|---|---|---|---|
| 6,459,990 B1 | 10/2002 | McCall et al. | |
| 2012/0029752 A1* | 2/2012 | Johnson et al. | 701/23 |
| 2012/0029754 A1* | 2/2012 | Thompson et al. | 701/23 |
| 2013/0184924 A1* | 7/2013 | Jagenstedt et al. | 701/23 |
| 2013/0282222 A1* | 10/2013 | Ozaki et al. | 701/23 |

FOREIGN PATENT DOCUMENTS

| | | |
|---|---|---|
| EP | 1 906 205 | 4/2008 |
| EP | 2 428 107 | 3/2012 |
| JP | 2002 352374 | 12/2002 |
| WO | 03/104909 | 12/2003 |
| WO | 2011/129728 | 10/2011 |

OTHER PUBLICATIONS

Search Report and Written Opinion dated Mar. 20, 2014 for corresponding Italian Patent Application No. MI20131252.
Joseph Moore et al.; "Powerline Perching with a Fixed-Wing UAV"; AIAA Infotech@Aerospace Conference; Apr. 6-9, 2009; Seattle, Washington.

* cited by examiner

*Primary Examiner* — Muhammad Shafi (57) ABSTRACT

It is described a working apparatus for a limited working area, comprising a base station configured to generate a magnetic field and a self-propelling robot. The self-propelling robot comprises means for moving the self-propelling robot in the working area, a gyroscope, a magnetic field sensor and a processing unit configured to control the movement of the self-propelling robot. The processing unit comprises a magnetic field search module configured to move the self-propelling robot so as to search for the set of contiguous magnetic field lines of force inside the working area according to a defined search path, and comprises a magnetic field tracking module configured to move the self-propelling robot to track at least a portion of the set of found contiguous lines of force by means of a plurality of maneuvers of crossing the set of found contiguous lines of force until reaching the base station.

10 Claims, 10 Drawing Sheets

WORKING APPARATUS FOR A LIMITED AREA

BACKGROUND

1. Technical Field

The present disclosure generally relates to the field of self-propelling robots. More in particular, the present disclosure relates to a working apparatus for a limited area.

2. Description of the Related Art

There are known self-propelling robots, such as for example lawn-mowing robots, pool cleaning robots, vacuum-cleaner robots or floor-washing robots. These robots are capable of moving autonomously by virtue of a rechargeable battery, which has the purpose of supplying power to the electrical and electromechanical devices present inside the robot, such as, for example, motors for moving wheels and blades, sensors and data processing units.

When the battery charge level is too low, the robot moves automatically until reaching a base recharging station, wherein the battery can be recharged.

Similarly, when the robot has completed the working cycle (for example, lawn mowing, pool cleaning, vacuum cleaning or floor washing), the robot moves automatically until reaching the base station, such as, for example, a point for draining the filter.

International patent application WO 03/104909 discloses an electronic navigational control system for a lawn-mowing robot. The system comprises a smaller inner conductor loop 3 and a larger outer loop 2 connected to an alternating current generator 1 (see FIG. 1), wherein the surface defined by the outer loop 2 corresponds to the working area of the self-propelling device. In this manner, the inner loop 3 and the outer loop 2 generate respective magnetic fields. The lawn-mowing robot includes a receiver 14 for the magnetic fields (for example, one or more conductive turns wound around a magnetic core) and uses the magnetic field received from the outer loop 2 and the inner loop 3 to return to a recharging station 3.

The Applicant has observed that said electronic navigational control system for lawn-mowing robots has the following disadvantages:
- it is too complex, because it requires the use of two current conductor loops;
- the time it takes the lawn-mowing robot to return to the recharging station 3 is too long;
- the lawn-mowing robot can reach the base only by following a preferential direction, in particular by following the direction in which the magnetic field is zero (see line 55 in FIG. 12);
- it is too expensive.

BRIEF SUMMARY

The present disclosure relates to a working apparatus for a limited area as defined in the enclosed claim 1 and by its preferred embodiments thereof described in dependent claims 2 to 10.

The Applicant has perceived that the working apparatus according to the present disclosure has the following advantages:
- it reduces the time it takes for the self-propelling robot to return to the base station or to a pre-established point and, consequently, it reduces the energy consumed to return to the base station;
- it increases the reliability of the process of returning to the base station;
- it is simple to implement;
- it is less expensive.

It is also an object of the present disclosure a method for controlling the return robot to a base station of a self-propelling as defined in the enclosed claim 11.

It is also an object of the present disclosure a computer readable medium as defined in the enclosed claim 12.

BRIEF DESCRIPTION OF THE SEVERAL VIEWS OF THE DRAWINGS

Further features and advantages of the disclosure will become apparent from the description that follows of a preferred embodiment and the variants thereof provided by way of example with reference to the appended drawings, in which.

DETAILED DESCRIPTION

Figure 1:
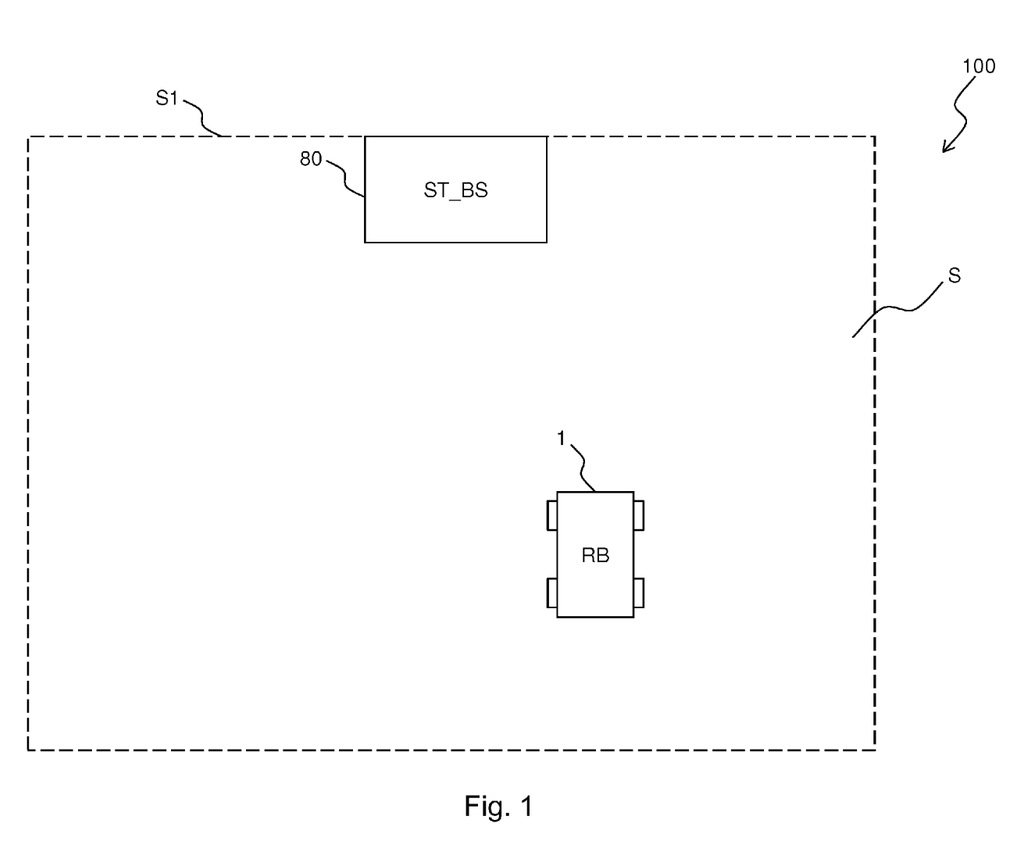
FIG. 1 schematically shows a working apparatus for a limited area according to one embodiment of the disclosure.

With reference to FIG. 1, it shows a working apparatus 100 for a limited area S according to one embodiment of the disclosure.

The working apparatus 100 comprises a base station 80 and a self-propelling robot 1.

The self-propelling robot 1 is configured to have a normal operating mode, a base return mode and a stand-by mode.

In the normal operating mode the self-propelling robot 1 is configured to perform a working cycle in the area S, indicated in FIG. 1 with a broken line. The self-propelling robot 1 is for example a lawn-mowing robot, a robot for cleaning swimming pools, a vacuum-cleaner robot or a floor-washing robot. If the self-propelling robot 1 is a lawn-mowing robot, the working area S is a garden delimited by a fence. If the self-propelling robot 1 is a robot for cleaning a swimming pool, the working area S is the swimming pool itself and is thus delimited by the vertical walls of the swimming pool. It should be observed that the working area S is not necessarily delimited by a physical obstacle, but can also be delimited in other ways, such as, for example, by a wire conducting electrical current.

In the base return mode the self-propelling robot 1 is configured to return automatically to the base station 80: this occurs when the battery 70 of the self-propelling robot 1 is low, or when the self-propelling robot 1 has completed a working cycle or when the working hours are over (for example, after 6:00 p.m.). For example, the base return mode is activated on expiry of a counter indicating the duration of a working cycle (for example, fifteen minutes) or when the charge level of the battery 70 inside the self-propelling robot 1 is lower than a pre-determined threshold.

In the stand-by mode, the self-propelling robot 1 is stationary inside the base station 80; during this mode the self-propelling robot 1 can be recharged or maintenance can be performed (for example, a filter is drained).

The base station 80 has the function of housing the self-propelling robot 1 when the latter has ended the working cycle. The base station 80 is positioned in a pre-established point, in particular along the perimeter of the working area S; for example, FIG. 1 shows that the base station 80 is positioned about halfway along the side S1 of the perimeter of the working area S. The base station 80 can be, for example:
- a recharging station, having the function of recharging the battery 70 of the self-propelling robot 1;
- a point for draining a filter.

The dimensions of the base station 80 are significantly smaller than the dimensions of the perimeter of the working area S. For example, let's consider a working area S having a rectangular shape with the greatest side S1 and the base station 80 also having a rectangular shape. In this the dimensions of the greatest side of the base station 80 are significantly smaller than the dimensions of the side S1 of the working area S; for example, the values of the greatest side of the base station 80 are comprised between 15 centimeters and 2 meters, while the values of the side S1 are comprised between 5 meters and 200 meters.

Figure 3:
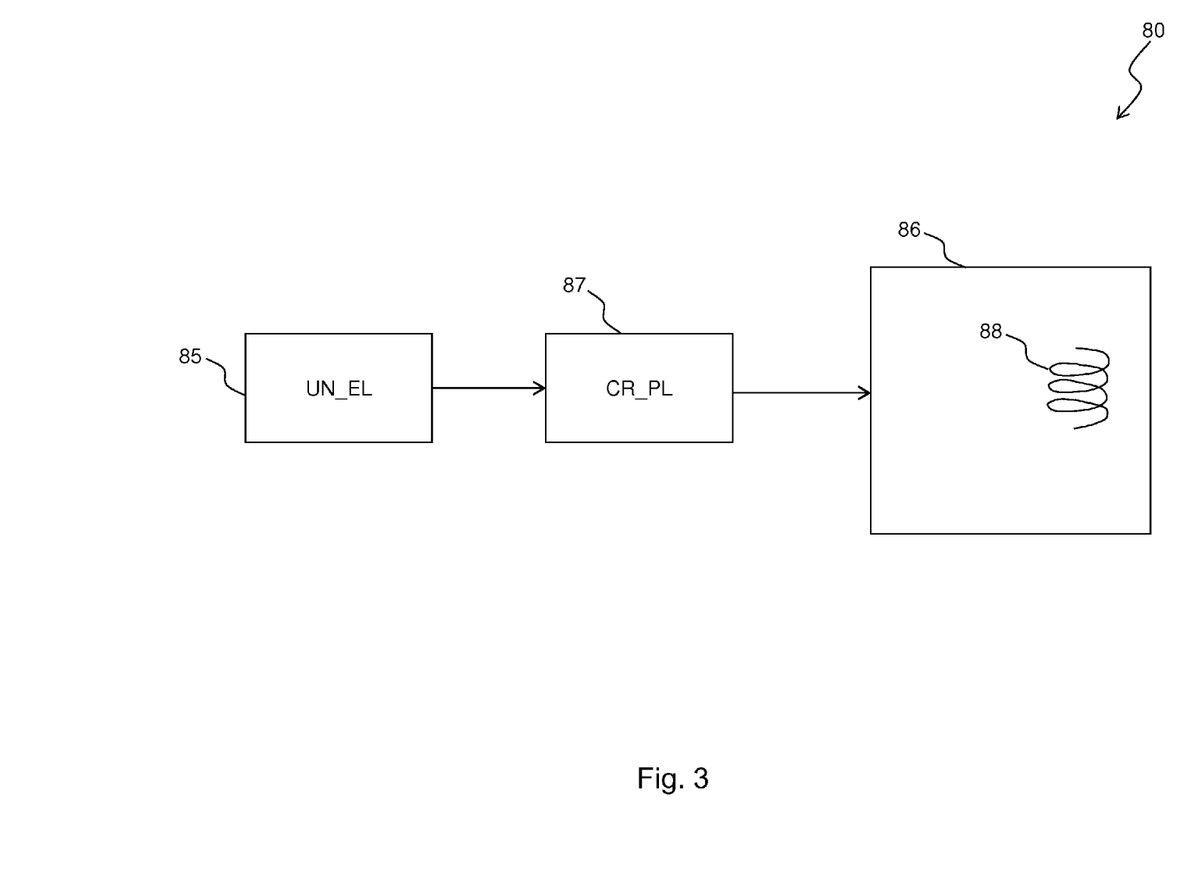
FIG. 3 shows a block diagram of the base station included into the working apparatus according to the embodiment of the disclosure.

With reference to FIG. 3, it shows the electronic components inside the base station 80. The base station 80 comprises:
- a processing unit 85;
- a driver circuit 87;
- a generator 86 of a magnetic field B.

The processing unit 85 has the function of controlling the value of the magnetic field B.

The driver circuit 87 has the function of providing suitable signals for controlling the magnetic field generator 86, as a function of the signals generated by the processing unit 85.

The magnetic field generator 86 has the function of generating a magnetic field B which extends at least in part over the working area S. Advantageously, the magnetic field B extends over a part of the working area S: in other words, the intensity of the magnetic field B is not sufficient to be detected by a magnetic field sensor 76 positioned inside the self-propelling robot 1. In this manner, the intensity of the magnetic field B generated by the base station 80 is reduced.

Figure 4:
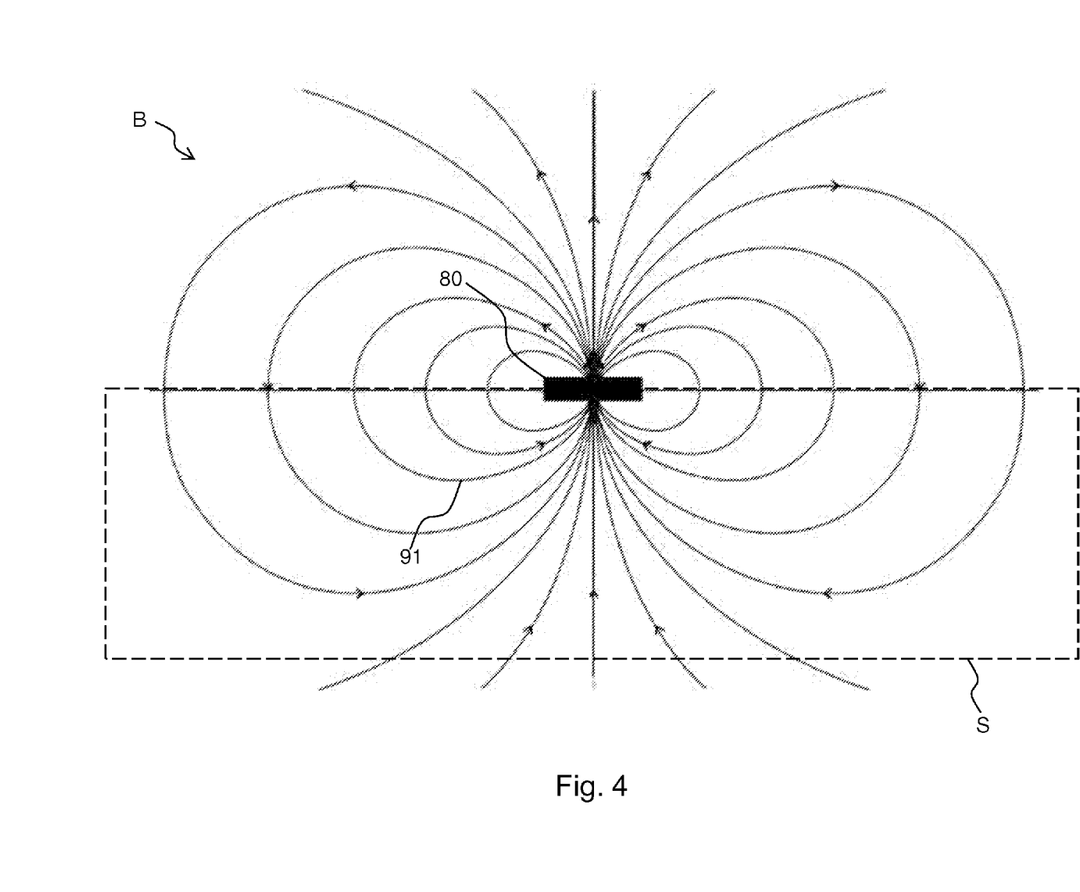
FIG. 4 schematically shows a possible pattern of the magnetic field generated by the base station.

The magnetic field B has a pattern of lines of force as schematically shown in FIG. 4. It is possible to observe that the lines of force of the magnetic field B extend over at least a part of the working area S. Moreover, all of the lines of force lie in directions which converge towards the base station 80, as shown for example by the line of force 91; in other words, all of the lines of force of the magnetic field B pass through the centre of the base station 80. This pattern of the lines of force of the magnetic field B is used by the self-propelling robot 1 to return to the base station 80, as it will be explained in greater detail below. It is observed that the finite number of lines of force shown in FIG. 4 are only a schematic representation which has the purpose of showing the direction of the magnetic field B, but in reality infinite lines of force are present; for example, the line of force 91 can be composed of a set of contiguous lines of force.

In one embodiment, the magnetic field generator 86 is implemented with a linear coil 88 of finite length (for example, 10 cm), or with an electrically conducting wire wound around a ferromagnetic core in such a way as to form a plurality of concentric turns, in which an alternating current I flows through the conducting wire. The length of the coil 88 (and thus of the ferromagnetic core) is perpendicular to the side S1 (of the perimeter of the working area S) along which the base station 80 is positioned, as shown by the arrow in FIG. 4.

Alternatively, the length of the coil 88 (and thus of the ferromagnetic core) is parallel to the side S1.

Figure 2:
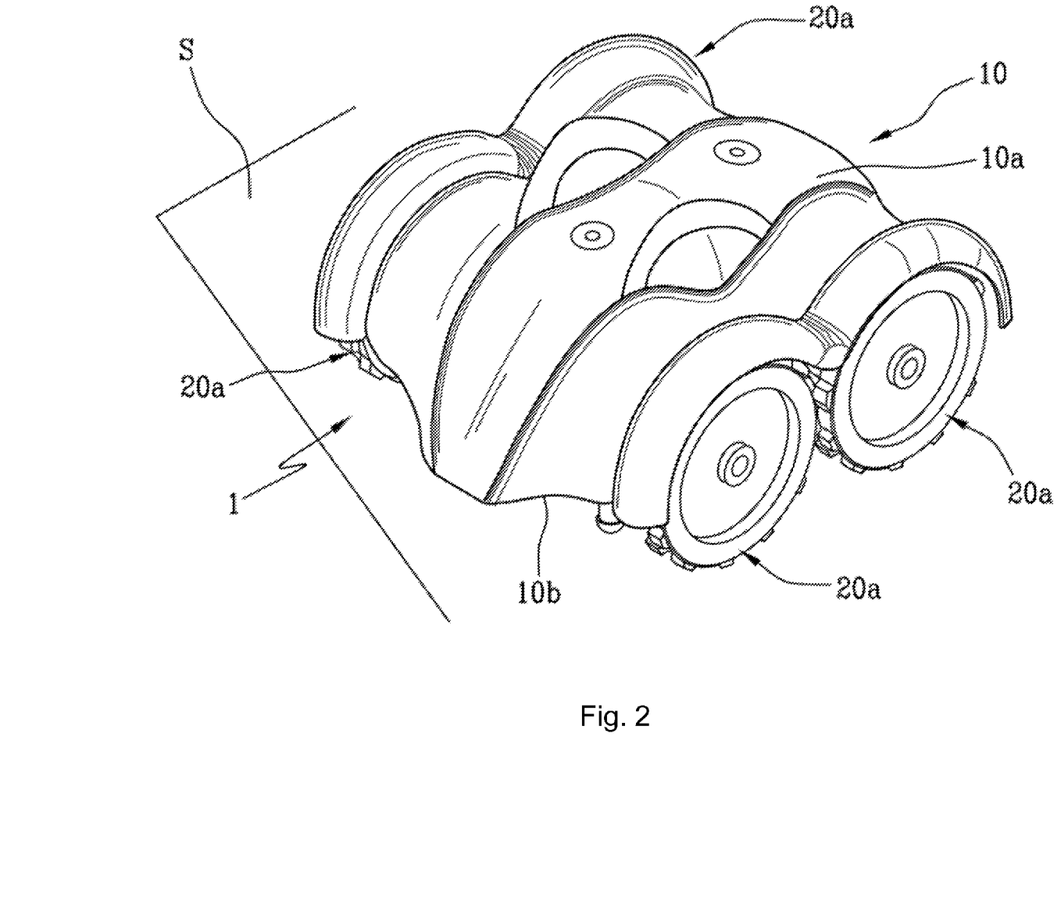
FIG. 2 schematically shows a perspective view of a self-propelling robot included into the working apparatus according to the embodiment of the disclosure.
Figure 5A:
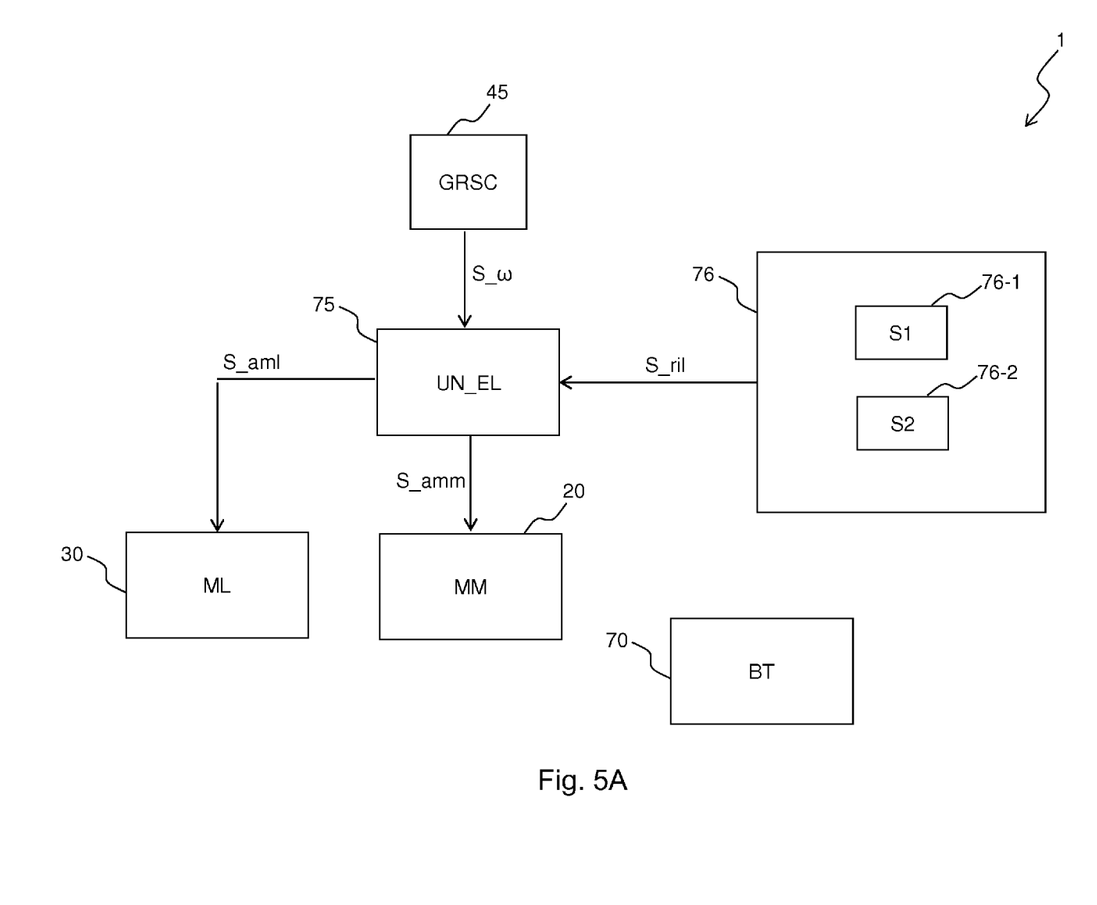
FIG. 5A shows a block diagram of the self-propelling robot.
Figure 5B:
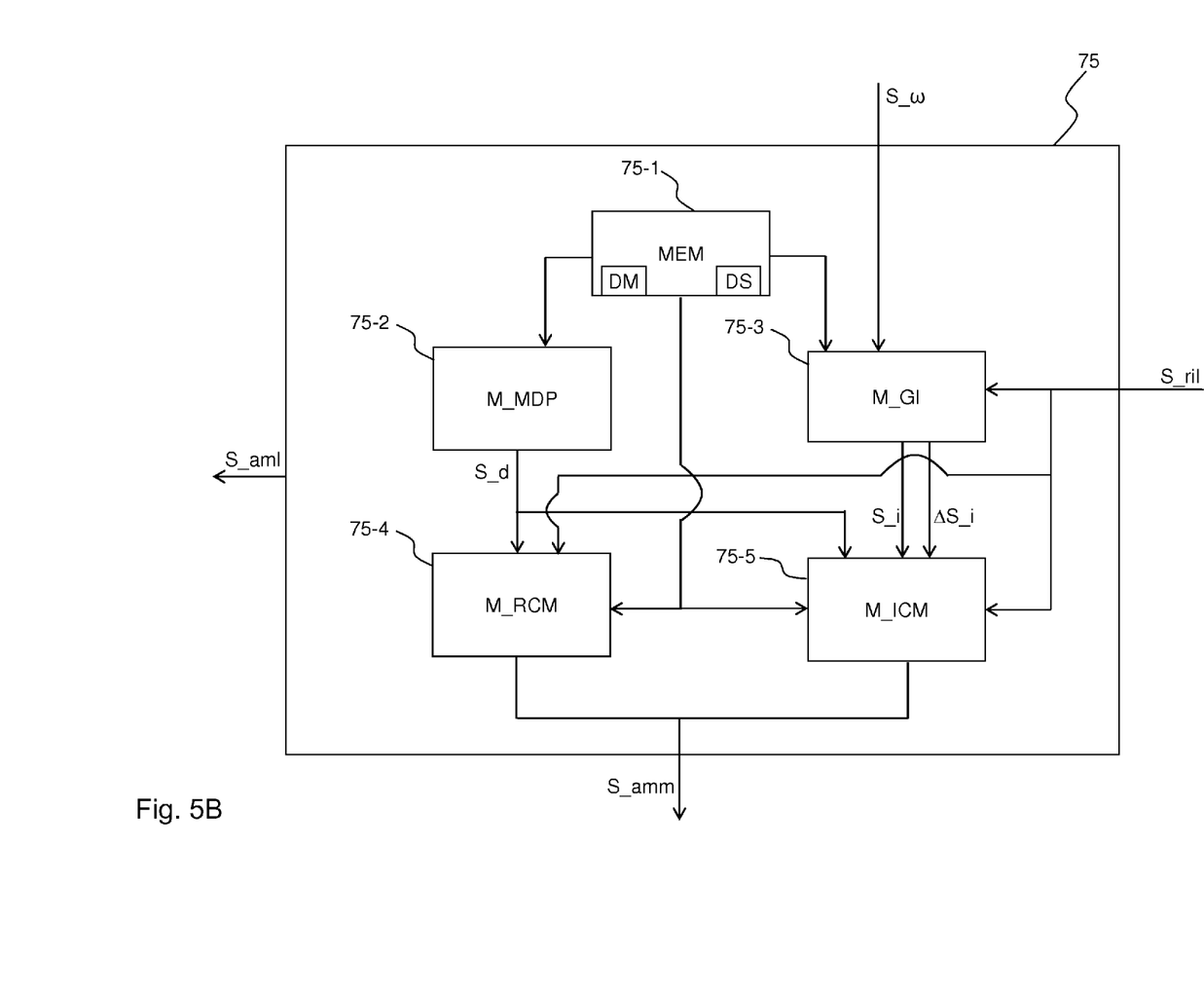
FIG. 5B shows more in detail the processing unit of the block diagram of FIG. 5A.

With reference to FIGS. 2 and 5A-5B, they show the electrical and electronic components of the self-propelling robot 1. The self-propelling robot 1 is configured to return automatically to the base station 80 when the battery 70 of the self-propelling robot 1 is low or when it has completed a working cycle or when the working hours are over (for example, after 6:00 p.m.) or for other functions depending on the application.

The self-propelling robot 1 comprises:
- a frame 10;
- moving means 20;
- working means 30;
- a processing unit 75;
- a battery 70;
- a gyroscope 45;
- a magnetic field sensor 76.

The moving means 20 are mounted on the frame 10 and have the function of moving the self-propelling robot 1 in the working area S in the normal operating mode and in the base return mode. The moving means 20 comprise, for example, one or more electric motors and four wheels 20a (see FIG. 2) connected to the electric motors; alternatively, a pair of tracks can be used in place of the wheels 20a, or else a combination of wheels and tracks. The electric motors are connected to the wheels 20a (and/or to the pair of tracks) by means of drive assemblies, in such a way as to set the four wheels 20a (and/or pair of tracks) in rotation and thus move the self-propelling robot 1 in the working area S.

The working means 30 have the function of performing a given type of work in the working area S during the normal operating mode. If the self-propelling robot 1 is a lawn-mowing robot, the working means 30 comprise one or more blades having the function of mowing the grass present in the mowing area S. If the self-propelling robot 1 is a robot for cleaning a swimming pool, the working means 30 comprise inlets for sucking in the debris positioned on the surface S which constitutes the bottom of the pool.

The gyroscope 45 has the function of measuring the angular velocity of the self-propelling robot 1 around an axis that is vertical with respect to the self-propelling robot 1 (or vertical with respect to the plane defined by the working area S wherein the self-propelling robot 1 moves). In particular, the gyroscope 45 is configured to generate an angular velocity signal $S\_\omega$ indicating the angular velocity $\omega$ of the self-propelling robot 1 around an axis that is vertical with respect to the self-propelling robot 1 (for example, a vertical axis that passes through the centre of gravity of the self-propelling robot 1).

The magnetic field sensor 76 has the function of detecting a set of contiguous lines of force of the magnetic field B generated by the base station 80. The term "set of contiguous lines of force" means the lines of force of the magnetic field B that are such to generate a magnetic flow concatenated with the magnetic field sensor 76. More in particular, the magnetic field sensor 76 is configured to detect the variation in the magnetic flow concatenated with the sensor 76 which is caused by a set of contiguous lines of force of the magnetic field B and is configured to generate, as a function of said variation in the concatenated magnetic flow, a detection signal S_ril indicating the position of the self-propelling robot 1 with respect to the set of contiguous lines of force of the magnetic field B or indicating the absence of the magnetic field B. Position means whether the self-propelling robot 1 is to the right or left of the set of contiguous lines of force of the magnetic field B.

In one embodiment, the self-propelling robot 1 comprises an accelerometer that has the function of measuring the acceleration of the self-propelling robot 1. In this manner, the processing unit 75 of the self-propelling robot 1 is capable of detecting whether the self-propelling robot 1 has reached the base station 80; moreover, the measured acceleration can be used to detect whether the self-propelling robot 1 has struck an obstacle.

The processing unit 75 has the function of controlling the movement of the self-propelling robot 1 in the working area S, by running algorithms implemented with software code portions. Said algorithms implement the normal operating mode, the base return mode and the stand-by mode.

The processing unit 75 is for example a microprocessor, in particular Renesas M32C. Alternatively, the processing unit 75 is a programmable electronic device (for example, an FPGA) or an application-specific integrated circuit (ASIC).

More in particular, in the normal operating mode the processing unit 75 is configured to generate a movement driving signal S_amm in order to control the moving means 20, which perform the movement of the self-propelling robot 1 in the working area S; moreover, the processing unit 75 is configured to generate a work driving signal S_aml in order to drive the working means 30, which perform a determined type of work in the working area S.

In the base return mode, the processing unit 75 is configured to receive a detection signal S_ril and the angular velocity signal S_ω as inputs and is configured to generate, as a function thereof, the movement driving signal S_amm in order to drive the moving means 20 to perform the return of the self-propelling robot 1 to the base station 80, as will be explained in greater detail below.

The base return mode comprises two phases:
a magnetic field search phase;
a subsequent magnetic field tracking phase.

In the magnetic field search phase, the self-propelling robot 1 searches for a set of contiguous lines of force of the magnetic field B by following a defined search path 94, as will be explained in greater detail below.

In the magnetic field tracking phase, the self-propelling robot 1 moves tracking the set of contiguous lines of force (previously found in the magnetic field search phase) by means of a plurality of maneuvers of crossing the contiguous lines of force, as will be explained in greater detail below, until reaching the base station 80. Therefore at the end of the base return mode the self-propelling robot 1 has reached the base station 80.

With reference to FIG. 5B, the processing unit 75 comprises:
a memory 75-1;
a traveled distance measurement module 75-2;
a yaw management module 75-3;
a magnetic field search module 75-4;
a magnetic field tracking module 75-5.

The traveled distance measurement module 75-2 performs an estimation of the distance traveled by the self-propelling robot 1 along the direction of forward travel. In particular, the distance measurement module is configured to generate, as a function of the values of parameters associated with the moving means 20, a traveled distance signal S_d indicating an estimation of the distance traveled by the self-propelling robot 1 along the direction of forward travel. The parameters associated with the moving means 20 are, for example, the diameter of the wheels 20a of the self-propelling robot 1 (read by the memory 75-1) and the number of revolutions completed by the wheels 20a.

The yaw management module 75-3 performs a calculation of the yaw angle, i.e. the angle traveled by the self-propelling robot 1 about an axis that is vertical with respect to the self-propelling robot 1 (for example, a vertical axis that passes through the centre of gravity of the self-propelling robot 1), i.e. vertical with respect to the plane defined by the working area S wherein the self-propelling robot 1 moves. In one embodiment, this angle is calculated by means of an operation of integrating the values of the angular velocity signal S_ω. In particular, the yaw management module 75-3 is configured to generate a yaw signal S_i indicating the present value of the yaw angle of the self-propelling robot 1.

The memory 75-1 is configured to store the values of a length DS of a straight segment and of a side DM, which will be explained in greater detail below.

Moreover, the memory 75-1 is configured to store a starting yaw value S_i-in indicating the yaw angle at the beginning of the magnetic field tracking phase, i.e. equal to the value of the yaw signal S_i at the beginning of the magnetic field tracking phase. Moreover, the memory 75-1 is configured to store a value of yaw angle minimum difference ΔS_i-min equal to the minimum difference of the yaw angle expected in a determined time interval at the end of a maneuver of crossing the set of contiguous lines of force during the magnetic field tracking phase in the base return mode. For example, ΔS_i-min is equal to 3 degrees in 10 seconds.

Moreover, the yaw management module 75-3 performs a calculation of the yaw angle actual difference ΔS_i equal to the difference between the value of the final yaw angle and the value of the starting yaw angle, wherein starting yaw angle means the value of the yaw angle at the beginning of the maneuver of crossing the set of contiguous lines of force and wherein final yaw angle means the value of the yaw angle at the end of the crossing maneuver.

The magnetic field search module 75-4 runs an algorithm (implemented with software code portions) to generate, as a function of the values of the detection signal S_ril and of the traveled distance signal S_d, the movement driving signal S_amm in order to move the self-propelling robot inside the working area S to search for a set of contiguous lines of force of the magnetic field B inside the working area S according to a defined search path 94, as will be described in greater detail below in the description related to the flow chart 200 in FIG. 7A.

Figure 7A:
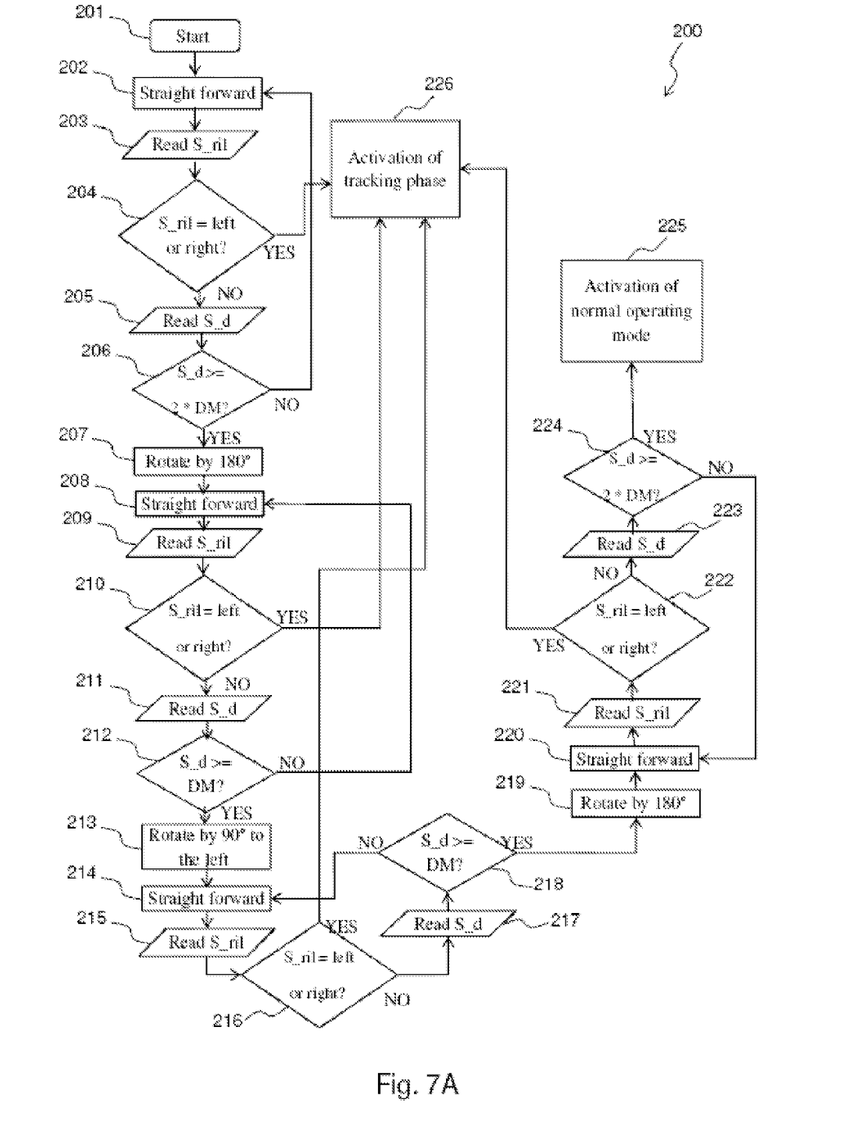
FIGS. 7A-7B show the flow charts of a magnetic field search phase and of a magnetic field tracking phase respectively of the base return mode performed by the processing unit of the self-propelling robot.
Figure 7B:
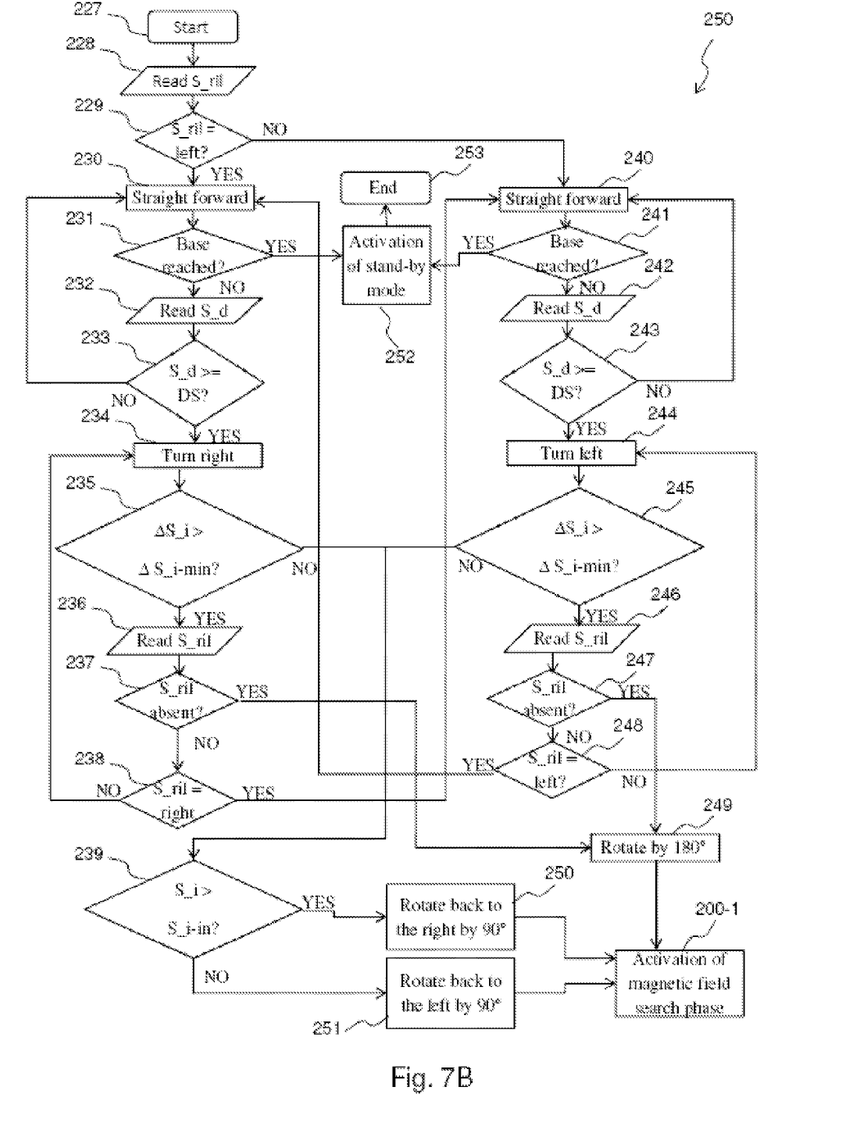

The magnetic field tracking module 75-5 runs an algorithm (implemented with software code portions) to generate, as a function of the values of the detection signal S_ril, of the angular velocity signal S_ω and of the traveled distance signal S_d, the movement driving signal S_amm in order to move the self-propelling robot inside the working area S to track the set of contiguous lines of force previously found by means of a plurality of maneuvers of crossing the set of the contiguous lines of force found until reaching the base station 80, as will be described in greater detail below in the description related to the flow chart 250 of FIG. 7B.

Advantageously, the magnetic field sensor 76 is implemented with two coils 76-1, 76-2, each composed of an electrically conducting wire wound around a ferromagnetic material in such a way as to form a plurality of concentric turns, wherein the mutual orientation of the coils 76-1, 76-2 is equal to 90 degrees (i.e. the two coils 76-1, 76-2 are physically positioned at 90 degrees from each other) and the position of the coils is horizontal with respect to the plane defined by the working area S. When the self-propelling robot 1 is in the magnetic field B generated by the base station 80, the magnetic field B has a flow concatenated with the surface of the two coils 76-1, 76-2, wherein the surface is the cross section of each coil 76-1, 76-2. The movement of the self-propelling robot 1 in the magnetic field B causes a variation in the flow concatenated with the coils 76-1, 76-2, which produces (by mutual induction) respective electromotive forces induced at the ends of the two coils 76-1, 76-2, wherein the induced electromotive forces have an amplitude and a phase which depends on the position of the two coils 76-1, 76-2 with respect to the set of contiguous lines of force of the magnetic field B. By measuring the phase and amplitude difference between the electromotive forces induced at the ends of the two coils 76-1, 76-2, it is possible to discriminate the position of the self-propelling robot 1 with respect to the set of contiguous lines of force of the magnetic field B (i.e. whether it is in a right or left position).

Therefore, if the magnetic field sensor 76 is implemented with two coils 76-1, 76-2, the detection signal S_ril is the phase and amplitude difference between the electromotive forces induced at the ends of the two coils 76-1, 76-2.

Figure 6A:
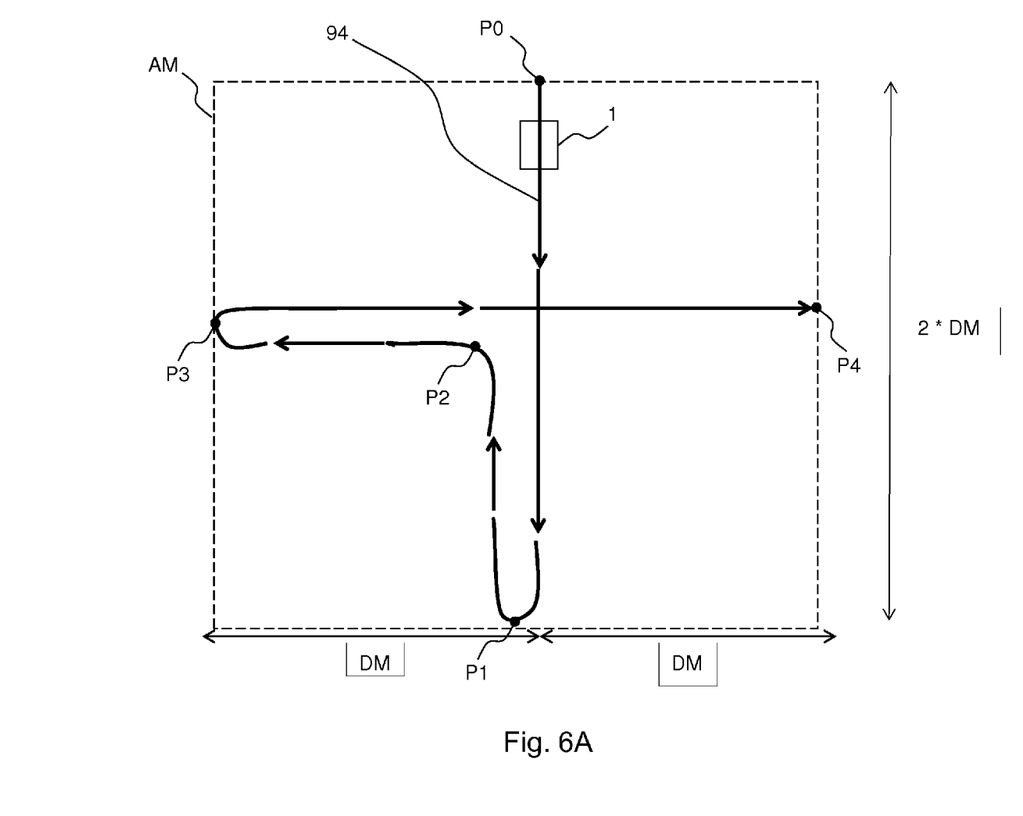
FIGS. 6A-6B show the search path and the tracking path followed by the self-propelling robot during a base return mode respectively.

With reference to FIG. 6A, it shows a search path 94 followed by the self-propelling robot 1 in the magnetic field search phase of the base return mode, wherein the self-propelling robot 1 searches for a set 91 of contiguous lines of force of the magnetic field B.

It is possible to observe that the self-propelling robot 1 is configured to follow at least a part of the search path 94 that is located inside an area of maneuver AM, which is a square having sides with a length 2*DM. The side DM has a much lower value than that of the side S1 of the perimeter of the working area S; for example, the side DM has a value equal to 1 meter.

In particular, the search path 94 comprises:
a portion comprised between the points P0 and P1 (excluding P1) which is substantially straight with a length 2*DM;
a point P1 wherein the self-propelling robot 1 performs a 180 degree rotation;
a portion comprised between the points P1 and P2 (excluding P2) which is substantially straight with a length DM;
a point P2 wherein the self-propelling robot 1 performs a 90 rotation degree to the left;
a portion comprised between the points P2 and P3 (excluding P3) which is substantially straight with a length DM;
a point P3 wherein the self-propelling robot 1 performs a 180 degree rotation so as to reverse the direction of travel;
a portion comprised between the points P3 and P4 which is substantially straight with a length 2*DM.

It is observed that the combination of the search path 94 together with the activation of the normal operating mode (step 225 in FIG. 7A) allows to guide the self-propelling robot 1 towards the area surrounding the base station 80 wherein the magnetic field B is present, as will be explained in greater detail below with reference to description of FIG. 7A.

Figure 6B:
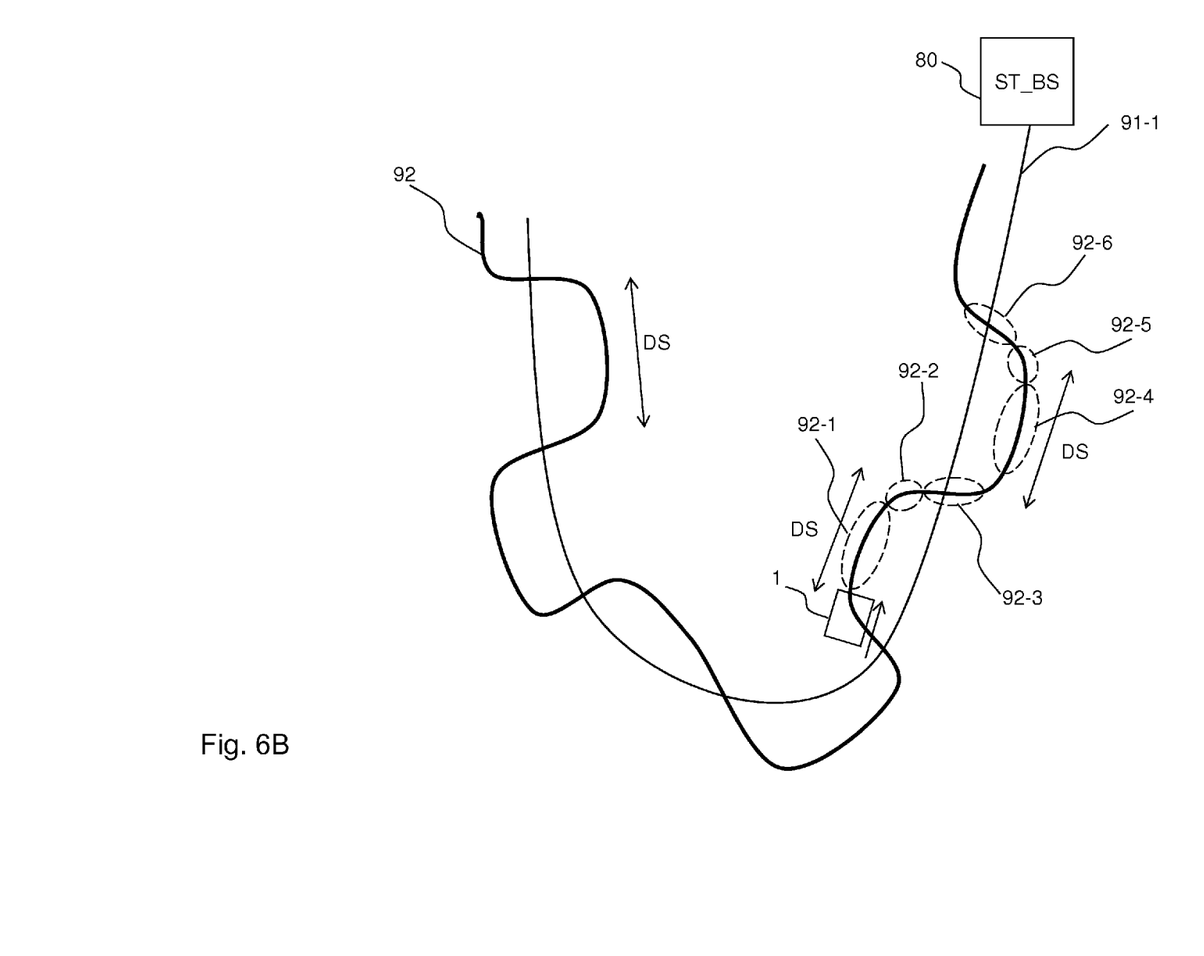

With reference to FIG. 6B, it shows the tracking path 92 followed by the self-propelling robot 1 to track a set of contiguous lines of force 91-1 in the magnetic field tracking phase of the base return mode and thus reach the base station 80. It is observed that the set of contiguous lines of force 91-1 is a portion of the line of force 91 shown in FIG. 4. In fact, after finding the set of contiguous lines of force 91-1, the self-propelling robot 1 remains locked to the set of contiguous lines of force and tracks it in the direction which converges towards the base station 80, until reaching it. Since the self-propelling robot 1 moves by tracking a set of contiguous lines of force in the direction converging towards the base station 80, this implies that it move towards a higher intensity of the magnetic field B.

It is possible to observe that the self-propelling robot 1 is configured to follow a zig-zag tracking path 92 around a set of contiguous lines of force 91-1 of the magnetic field B, by means of a plurality of maneuvers of crossing the set of contiguous lines of force 91-1. In particular, the tracking path 92 comprises:
portions 92-1, 92-4 of a length DS wherein the self-propelling robot 1 moves in a direction which is substantially parallel to the set of contiguous lines of force 91-1 of the magnetic field B;
portions 92-2, 92-5 wherein the self-propelling robot 1 performs a rotation towards the set of contiguous lines of force 91-1;
portions 92-3, 92-6 wherein the self-propelling robot 1 moves in a direction substantially perpendicular to the set of contiguous lines of force 91-1, in such a way as to cross the set of contiguous lines of force 91-1.

The portions 92-2 and 92-3 together constitute the maneuver of crossing the set of contiguous lines of force 91-1. Analogously, the portions 92-5 and 92-6 together constitute another maneuver of crossing the set of contiguous lines of force 91-1.

The value of the length DS is determined experimentally and is for example equal to 4 cm.

It is observed that the tracking path 92 followed by the self-propelling robot 1 is particularly advantageous because it allows the self-propelling robot 1 to return to the base station 80 in reduced times and in a reliable manner from any point of the working area S wherein the magnetic field B is present, without following a preferential direction.

FIG. 7A shows the flow chart 200 of the magnetic field search phase of the base return mode and the FIG. 7B shows the flow chart 250 of the magnetic field tracking phase of the base return mode. The steps 201-226 of the flow chart 200 and the steps 227-253 of the flow chart 250 are performed by the processing unit 75, by means of respective algorithms implemented with software code portions. The programming language used is for example the C language.

The flow chart 200 receives as inputs the value of the side DM, the detection signal S_ril generated by the magnetic field sensor 76 and the traveled distance signal S_d calculated by the processing unit 75 and generates as output the movement driving signal S_amm to drive the moving means 20 and thus to move the self-propelling robot 1 to follow the search path 94 shown in FIG. 6A.

The flow chart 250 receives the following signals as inputs:
the length DS;
the detection signal S_ril;
the yaw angle minimum difference $\Delta S\_i\_min$;
the starting yaw value S_i-in;
the traveled distance signal S_d;
the yaw signal S_i.

In the flow chart 250 the movement driving signal S_amm is generated as output, as a function of the values of the above described input signals, in order to drive the moving means 20 and thus to move the self-propelling robot 1 so as to track the set of the contiguous lines of force previously found (by means of the flow chart 200) according to the tracking path 92 shown in FIG. 6B, until reaching the base station 80.

The magnetic field search phase is activated for example when the charge level of the battery 70 inside the self-propelling robot 1 is lower a pre-determined threshold, or on expiry of a counter indicating the duration of a working cycle (for example, fifteen minutes) or when the working hours are over (for example, after 6:00 p.m.).

With reference to the flow chart 200 in FIG. 7A, the magnetic field search phase of the base return mode begins with the step 201.

In step 202 the self-propelling robot 1 moves straight forward, i.e. along a substantially straight trajectory, as shown in the portion of the search path 94 of FIG. 6A comprised between P0 and P1 (excluding P1).

In step 203 it is read the value of the detection signal S_ril.

In step 204 it is verified whether the value of the detection signal S_ril indicates that the self-propelling robot 1 is to the left or to the right of a set of contiguous lines of force:
- in the negative case (i.e. the magnetic field B was not detected), it continues to step 205;
- in the positive case, it continues to step 226 wherein the magnetic field tracking phase is activated, because the self-propelling robot 1 has already detected the presence of the magnetic field B by means of a set of contiguous lines of force.

In step 205 it is read the value of the traveled distance signal S_d indicating the distance traveled by the self-propelling robot 1.

In step 206 it is verified whether the value of the traveled distance signal S_d is greater than or equal to 2*DM:
- in the negative case, it returns to step 202 and the self-propelling robot 1 continues to move straight forward;
- in the positive case, it continues to step 207.

Therefore the loop composed of the steps 202, 203, 204, 205, 206 is performed until the self-propelling robot 1 finds a set of contiguous lines of force of the magnetic field B or until the self-propelling robot 1 has traveled a distance equal to 2*DM (i.e. the portion of the search path 94 of FIG. 6A comprised between the points P0 and P1).

In step 207 the self-propelling robot 1 rotates around itself by 180 degrees, as shown in the point P1 of FIG. 6A.

In step 208 the self-propelling robot 1 moves straight forward, as shown in the portion of the search path 94 of FIG. 6A comprised between P1 and P2.

In step 209 it is read the value of the detection signal S_ril.

In step 210 it is verified whether the value of the detection signal S_ril indicates that the self-propelling robot 1 is to the left or to the right of a set of contiguous lines of force:
- in the negative case (i.e. the magnetic field B was not detected), it continues to step 211;
- in the positive case, it continues to step 226 wherein the magnetic field tracking phase is activated, because the self-propelling robot 1 has already detected the presence of the magnetic field B by means of a set of contiguous lines of force.

In step 211 it is read the value of the traveled distance signal S_d indicating the distance traveled by the self-propelling robot 1.

In step 212 it is verified whether the value of the traveled distance signal S_d is greater than or equal to DM:
- in the negative case, it returns to step 208 and the self-propelling robot 1 continues moving straight forward;
- in the positive case, it continues to step 213.

Therefore the loop composed of the steps 208, 209, 210, 211, 212 is performed until the self-propelling robot 1 finds a set of contiguous lines of force of the magnetic field B or until the self-propelling robot 1 has traveled a distance equal to DM (i.e. the portion of the search path 94 of FIG. 6A comprised between the points P1 and P2).

In step 213 the self-propelling robot 1 rotates by 90 degrees to the left, as shown in the point P2 of FIG. 6A.

In step 214 the self-propelling robot 1 moves straight forward, as shown in the portion of the search path 94 of FIG. 6A comprised between P2 and P3.

In step 215 it is read the value of the detection signal S_ril.

In step 216 it is verified whether the value of the detection signal S_ril indicates that the self-propelling robot 1 is to the left or to the right of a set of contiguous lines of force:
- in the negative case (i.e. the magnetic field B was not detected), it continues to step 217;
- in the positive case, it continues to step 226 wherein the magnetic field tracking phase is activated, because the self-propelling robot 1 has already detected the presence of the magnetic field B by means of a set of contiguous lines of force.

In step 217 it is read the value of the traveled distance signal S_d indicating the distance traveled by the self-propelling robot 1.

In step 218 it is verified whether the value of the traveled distance signal S_d is greater than or equal to DM:
- in the negative case, it returns to step 214 and the self-propelling robot 1 continues moving straight forward;
- in the positive case, it continues to step 219.

Therefore the loop composed of the steps 214, 215, 216, 217, 218 is performed until the self-propelling robot 1 finds a set of contiguous lines of force of the magnetic field B or until the self-propelling robot 1 has traveled a distance equal to DM (i.e. the portion of the search path 94 of FIG. 6A comprised between the points P2 and P3).

In step 219 the self-propelling robot 1 rotates by 180 degrees around itself, as shown in the point P3 of FIG. 6A.

In step 220 the self-propelling robot 1 moves straight forward, as shown in the portion of the search path 94 of FIG. 6A comprised between P3 and P4.

In step 221 it is read the value of the detection signal S_ril.

In step 222 it is verified whether the value of the detection signal S_ril indicates that the self-propelling robot 1 is to the left or to the right of a set of contiguous lines of force:
- in the negative case (i.e. the magnetic field B was not detected), it continues to step 223;
- in the positive case, it continues to step 226 wherein the magnetic field tracking phase is activated, because the self-propelling robot 1 has already detected the presence of the magnetic field B by means of a set of contiguous lines of force.

In step 223 it is read the value of the traveled distance signal S_d indicating the distance traveled by the self-propelling robot 1.

In step 224 it is verified whether the value of the traveled distance signal S_d is greater than or equal to 2*DM:
- in the negative case, it returns to step 220 and the self-propelling robot 1 continues moving straight forward;
- in the positive case, it continues to step 225.

In step 225 the normal operating mode is activated.

Therefore, if the self-propelling robot 1 has completed the search path 94 and has not found the set of contiguous lines of force of the magnetic field B, the self-propelling robot 1 quits the base return mode and goes back to the normal operating mode, wherein it performs the movements analogously to when it performs a working cycle in the working area S. Subsequently, the self-propelling robot 1 will again make a transition from the normal operating mode to the magnetic field search phase of the base return mode, following again the search path 94, but starting from a different starting position inside the working area S: in this manner the self-propelling robot 1 will follow a different trajectory (compared to the one of the previous magnetic field search phase) inside the working area S and thus there will be an increased probability of the self-propelling robot 1 being located (along the search path 94) in a position of the working area S wherein the magnetic field B is present, as a result of subsequent activations of the magnetic field search phase.

According to one variant of the magnetic field search phase, the side DM of the search path 94 has a greater value which is proportional to the side S1 of the perimeter of the working area S (for example, the value of the side DM is half the value of the side S1). For example, the side DM has a value equal to 50 meters. In this manner, when the search phase is activated at the end of the working cycle, the self-propelling robot 1 will perform the movements according to the search path 94 and is able of covering the most of the working area S. In this manner, there will be an increased probability of the sensor 76 detecting the magnetic field B the first time the self-propelling robot 1 follows the search path 94, thus reducing the probability of activating the normal operating mode (step 225) and a subsequent second search phase.

With reference to the flow chart 250 in FIG. 7B, the magnetic field tracking phase of the base return mode begins with step 227.

In step 228 it is read the value of the detection signal S_ril.

In step 229 it is verified whether the value of the detection signal S_ril indicates that the self-propelling robot 1 is to the left of a set of contiguous lines of force:
  in the positive case (i.e. the self-propelling robot 1 is to the left of the set of contiguous lines of force), it continues to step 230;
  in the negative case (i.e. the self-propelling robot 1 is to the right of the set of contiguous lines of force), it continues to step 240.

In step 230 the self-propelling robot 1 moves straight forward, as shown in the portion 92-1 of the tracking path 92 of FIG. 6B.

In step 231 it is verified whether the self-propelling robot 1 has reached the base station 80:
  in the positive case, it continues to step 252, wherein the magnetic field tracking phase of the base return mode is concluded because the self-propelling robot 1 has reached the base station 80 and the stand-by mode is thus activated;
  in the negative case, it continues to step 232.

In step 232 it is read the value of the traveled distance signal S_d indicating the distance traveled by the self-propelling robot 1.

In step 233 it is verified whether the value of the traveled distance signal S_d is greater than or equal to the value of the length DS:
  in the negative case, it returns to step 230 and the self-propelling robot 1 continues moving straight forward;
  in the positive case, it continues to step 234.

Therefore the loop composed of the steps 230, 231, 232, 233 is performed until the self-propelling robot 1 has traveled a distance equal to DS, i.e. the entire portion 92-1 of FIG. 6B.

In step 234 the self-propelling robot 1 turns to the right, thus beginning to travel along the portion 92-2 of the tracking path 92.

In step 235 it is verified whether the value of the yaw angle actual difference ΔS_i is greater than the value of the yaw angle minimum difference ΔS_i-min:
  in the negative case, it continues to step 239;
  in the positive case, it continues to step 236.

In step 236 it is read the value of the detection signal S_ril.

In step 237 it is verified whether the value of the detection signal S_ril indicates that the magnetic field B is not present:
  in the positive case, it continues to step 249;
  in the negative case, it continues to step 238.

In step 238 it is verified whether the value of the detection signal S_ril indicates that the self-propelling robot 1 is to the right of a set of contiguous lines of force:
  in the negative case (i.e. the self-propelling robot 1 is still located to the left of the set of contiguous lines of force), it returns to step 234 and the self-propelling robot 1 continues turning to the right;
  in the positive case (i.e. the self-propelling robot 1 is located to the right of the set of contiguous lines of force), it continues to step 240.

Therefore the loop composed of the steps 234, 235, 236, 237, 238 is performed until the self-propelling robot 1 has traveled the entire portion 92-3 of the tracking path 92 and is located to the right of the set of contiguous lines of force.

In step 240 the operation is analogous to that described previously starting from step 230, with the difference that the self-propelling robot 1 is located to the right of the set of contiguous lines of force. In particular:
  the loop composed of the steps 240, 241, 242, 243 is performed until the self-propelling robot 1 has traveled a distance equal to DS, i.e. the entire portion 92-4 of FIG. 6B;
  the loop composed of the steps 244, 245, 246, 247, 248 is performed until the self-propelling robot 1 has traveled the entire portion 92-6 of the tracking path 92 and is located to the left of the set of contiguous lines of force.

From steps 237 and 247 it continues to step 249 in case wherein it is detected that the magnetic field B is not present. This occurs in the event that the self-propelling robot 1 has moved in a direction opposite to the one wherein the base station 80 is located.

Therefore in step 249 the self-propelling robot 1 performs a 180 degree rotation around itself: in this way the self-propelling robot 1 will again be positioned in the direction towards the base station 80 and there will again be an activation of the magnetic field search phase of the base return mode (step 200-1) wherein the flow chart 200 is again executed.

From steps 235 and 245 it continues to step 239 in case wherein the value of the yaw angle actual difference ΔS_i is smaller than the value of the minimum yaw angle difference ΔS_i-min. This occurs in the event that the self-propelling robot 1 has reached an obstacle or in the event that the self-propelling robot 1 is in proximity to the base station 80, in particular in the event that it has reached a lateral wall of the base station 80: under these conditions, in fact, the value of the yaw angle (signal S_i) does not increase notwithstanding that the self-propelling robot 1 has performed a rotation to the right in step 234 (or to the left in step 244).

In step 239 it is verified whether the present value of the yaw angle (signal S_i) is greater than the starting yaw value S_i-in:
  in the positive case, it continues to step 250;
  in the negative case, it continues to step 251.

In step 250 the self-propelling robot 1 performs a 90 degree back-rotation to the right (in other words, the self-propelling robot 1 travels rightward over an arc of a circle that forms a 90 degree angle), whereas in step 252 the self-propelling robot 1 performs a 90 degree back-rotation to the left (in other words, the self-propelling robot 1 travels leftward over an arc of a circle that forms a 90 degree angle): in this manner the self-propelling robot 1 will be positioned facing the base station 80 and there will again be an activation of the magnetic field search phase of the base return mode (step 200-1) wherein the flow chart 200 is again executed.

Advantageously, when the self-propelling robot 1 is positioned inside the base station 80, the battery 70 is recharged by means of an inductive coupling between the generator 86 of the magnetic field B inside the base station 80 and the sensor 76 of the magnetic field B inside the self-propelling robot 1, as described in greater detail in European patent application no. 12160183.5 filed on 19 Mar. 2012 in the name of the same Applicant.

It will be described hereinafter the operation of the working apparatus 100, referring also to FIGS. 6A, 6B, 7A, 7B.

For the sake of simplicity, it is assumed that the self-propelling robot 1 is a lawn-mowing robot, that the working means 30 are blades and that the working area S is a lawn wherein it is necessary to mow the grass.

At the starting time t0 the lawn-mowing robot 1 is in the normal operating mode, wherein it performs a grass mowing cycle in the lawn S.

In the instants comprised between t0 and t1 (excluding t1) the lawn-mowing robot 1 mows the grass in at least a part of the lawn S.

At time t1 (subsequent to t0), the processing unit 75 inside the lawn-mowing robot 1 detects that the battery 70 is discharging and activates the base return mode; in particular, the processing unit 75 activates the magnetic field search phase of the base return mode.

In the instants between t1 and t2 (excluding t2) the lawn-mowing robot 1 follows the search path 94 shown in FIG. 6A up to point P3 and then carries out steps 201-215 of the method 200 of FIG. 7A, as previously described.

At time t2 (subsequent to t1) the sensor 76 generates the detection signal S_ril which indicates that the lawn-mowing robot 1 is located to the left of a set of contiguous lines of force and thus the processing unit 75 activates the tracking phase (steps 216 and 226 of the method 200 of FIG. 7A).

At time t3 (subsequent to t2) the lawn-mowing robot begins following the zig-zag tracking path 92 around the set of lines of force found at time t2, carrying out steps 228, 229 of the method 250 of FIG. 7B.

In the instants comprised between t3 and t4 the lawn-mowing robot 1 follows the zig-zag tracking path 92 around the set of lines of force found at time t2, carrying out the steps of the method 250 of FIG. 7B (except for step 200-1), as previously described.

At time t4 (subsequent to t3), the lawn-mowing robot 1 detects that it has reached the base station 80 and activates the stand-by mode.

According to a first variant of the operation, in the instants comprised between t1 and t2 (excluding t2) the lawn-mowing robot 1 follows the whole search path 94 shown in FIG. 6A up to point P4 without detecting the presence of the magnetic field B and thus carries out the steps of the method 200 of FIG. 7A until arriving at step 224.

At time t1' the processing unit 75 activates for a first time the normal operating mode (step 225) and the lawn-mowing robot 1 resumes the working cycle.

At time t1" (subsequent to t1', for example of a defined time interval) the processing unit 75 activates for a second time the magnetic field search phase.

In the instants comprised between t1" and t1'" (excluding t1'") the lawn-mowing robot 1 follows a part of the search path 94 shown in FIG. 6A.

At time t2 (subsequent to t1'") the sensor 76 generates the detection signal S_ril indicating that the lawn-mowing robot 1 is located to the left of a set of contiguous lines of force and thus the processing unit 75 activates the tracking phase (step 226 of the method 200 of FIG. 7A) and thus the operation continues analogously to what was previously described at time t2.

According to a second variant of the operation, in the instants comprised between t1 and t2 (t2 excluded) the lawn-mowing robot 1 follows for a first time the whole search path 94 in the search phase, executes for a first time the normal operating mode, follows for a second time the whole search path 94 in the search phase, executes for a second time the normal operating mode, follows for a third time a part of the search path 94 and finally carries out the tracking phase.

It is also an object of the present disclosure a method for controlling the return to a base station of a self-propelling robot. The method comprises the step a) of generating a magnetic field extending at least in part over a limited working area, the step b) of activating a base return mode, the step c) of moving the self-propelling robot inside the working area to search for a set of contiguous lines of force of the magnetic field inside the working area according to a defined search path, and the step d) of moving the self-propelling robot inside the working area to track at least a portion of the set of found contiguous lines of force by means of a plurality of maneuvers of crossing the set of the found contiguous lines of force until reaching the base station It is also an object of the present disclosure a computer readable medium having a program recorded thereon, said computer readable medium comprising computer code means adapted to perform the steps b), c), d) of the method for controlling the return to the base station of the self-propelling robot, when said program is run on an a computer.

The invention claimed is:

1. Working apparatus for a limited working area, the apparatus comprising:
    a base station configured to generate a magnetic field extending at least in part over the working area;
    a self-propelling robot having a normal operating mode wherein it performs a working cycle in the working area and a base return mode wherein it returns automatically to the base station, the self-propelling robot comprising:
        means for moving the self-propelling robot in the working area, as a function of a movement driving signal;
        a gyroscope configured to generate an angular velocity signal indicating the measure of the angular velocity of the self-propelling robot around an axis substantially vertical with respect to the plane of the working area;
        a magnetic field sensor configured to generate a detection signal indicating a right or left position of the self-propelling robot with respect to a set of contiguous magnetic field lines of force;
        a processing unit configured to control the movement of the self-propelling robot inside the working area, the processing unit comprising:
            a magnetic field search module configured, during a magnetic field search phase of the base return mode, to generate, as a function of the values of the detection signal and of a traveled distance signal indicating the estimation of the distance traveled by the self-propelling robot, the movement driving signal for moving the self-propelling robot inside the working area to search for the set of contiguous magnetic field lines of force inside the working area according to a defined search path;
            a magnetic field tracking module configured, during a magnetic field tracking phase of the base return mode subsequent to the magnetic field search phase, to generate, as a function of the values of the detection signal, of the angular velocity signal and of the traveled distance signal, the movement driving signal for moving the self-propelling robot inside the working area to track at least a portion of the set of found contiguous lines of force by means of a plurality of maneuvers of crossing the set of found contiguous lines of force until reaching the base station.

2. Working apparatus according to claim 1, wherein the processing unit further comprises a traveled distance measurement module configured to generate, as a function of values of parameters associated with the moving means, the traveled distance signal indicating the estimation of the distance traveled by the self-propelling robot, wherein the magnetic field search module is configured to:
   generate the movement driving signal for moving the self-propelling robot inside the working area according to the defined search path;
   receive the detection signal indicating the right or left position of the self-propelling robot with respect to the set of contiguous magnetic field lines of force and activate the tracking phase;
   receive the detection signal indicating the absence of the magnetic field and the traveled distance signal indicating the conclusion of the search path and activate the normal operating mode and subsequently activate the search phase.

3. Working apparatus according to claim 1, wherein the processing unit further comprises:
   a yaw management module configured to:
      generate, as a function of the value of the angular velocity signal, a yaw signal indicating the present value of the yaw angle of the self-propelling robot;
      calculate a difference of the yaw angle equal to the difference between the value of the final yaw angle and the value of the starting yaw angle;
   a memory configured to store:
      a starting yaw value indicating the yaw angle at the beginning of the magnetic field search phase;
      a value of yaw angle minimum difference equal to the minimum difference of the yaw angle expected at the end of a maneuver of crossing the set of contiguous lines of force;
wherein the magnetic field tracking module is configured to:
   receive the detection signal indicating the left position of the self-propelling robot with respect to the set of contiguous lines of force;
   generate the movement driving signal for moving the self-propelling robot along a defined straight segment;
   receive the traveled distance signal indicating the value of the defined straight segment and generate the movement driving signal for performing a turn to the right of the self-propelling robot;
   detect that the value of the yaw angle actual difference is greater than the value of the yaw angle minimum difference, receive the detection signal indicating the left position of the self-propelling robot with respect to the set of found contiguous lines of force and generate the movement driving signal to continue to perform the turn to the right of the self-propelling robot;
   detect that the value of the yaw angle actual difference is greater than the value of yaw angle minimum difference, receive the detection signal indicating the right position of the self-propelling robot with respect to the set of found contiguous lines of force and generate the movement driving signal for moving the self-propelling robot along the defined straight segment.

4. Working apparatus according to claim 3, wherein the magnetic field tracking module is configured to detect that the value of the yaw angle actual difference is greater than the value of the yaw angle minimum difference, receive the detection signal indicating the absence of the magnetic field and generate the movement driving signal for performing a 180 degree rotation of the self-propelling robot, and activate the magnetic field search phase.

5. Working apparatus according to claim 3, wherein the magnetic field tracking module is configured to:
   detect that the value of the yaw angle actual difference is smaller than the value of the yaw angle minimum difference, detect that the present value of the yaw angle is greater than the starting yaw value, generate the movement driving signal for performing a back-rotation of the self-propelling robot to the right of 90 degrees and activate the magnetic field search phase;
   detect that the value of the yaw angle actual difference is smaller than the value of the yaw angle minimum difference, detect that the present value of the yaw angle is smaller than the starting yaw value, generate the movement driving signal for performing a back-rotation of the self-propelling robot to the left of 90 degrees and activate the magnetic field search phase.

6. Working apparatus according to claim 1, wherein the magnetic field sensor is implemented with two coils having a mutual orientation of about 90 degrees and having a position that is horizontal with respect to the plane defined by the working area, wherein the detection signal is the phase and amplitude difference between the electromotive forces induced at the ends of the two coils.

7. Working apparatus according to claim 1, wherein the base station is configured to generate the magnetic field over a portion of the working area.

8. Working apparatus according to claim 1, wherein the self-propelling robot is, alternatively:
   a lawn-mower robot;
   a robot for cleaning a swimming-pool;
   a vacuum-cleaner robot;
   a floor-washing robot.

9. Working apparatus according to claim 3, wherein the self-propelling robot comprises a rechargeable battery and wherein the battery is charged by means of an inductive coupling between a magnetic field generator and the magnetic field sensor, when the self-propelling robot is located inside the base station in a stand-by mode.

10. Working apparatus according to claim 1, wherein the base station is positioned in a point along the perimeter of the working area.

* * * * *

UNITED STATES PATENT AND TRADEMARK OFFICE
CERTIFICATE OF CORRECTION

PATENT NO. : 9,081,386 B2  
APPLICATION NO. : 14/317236  
DATED : July 14, 2015  
INVENTOR(S) : Fabrizio Bernini Page 1 of 1

It is certified that error appears in the above-identified patent and that said Letters Patent is hereby corrected as shown below:

On the title page, insert Item (30)

--Foreign Application Priority Data

Jul. 25, 2013 [IT] Italy ... MI2013A001252--.

Signed and Sealed this
Twenty-sixth Day of April, 2016

Michelle K. Lee
*Director of the United States Patent and Trademark Office*